Patented Mar. 5, 1929.

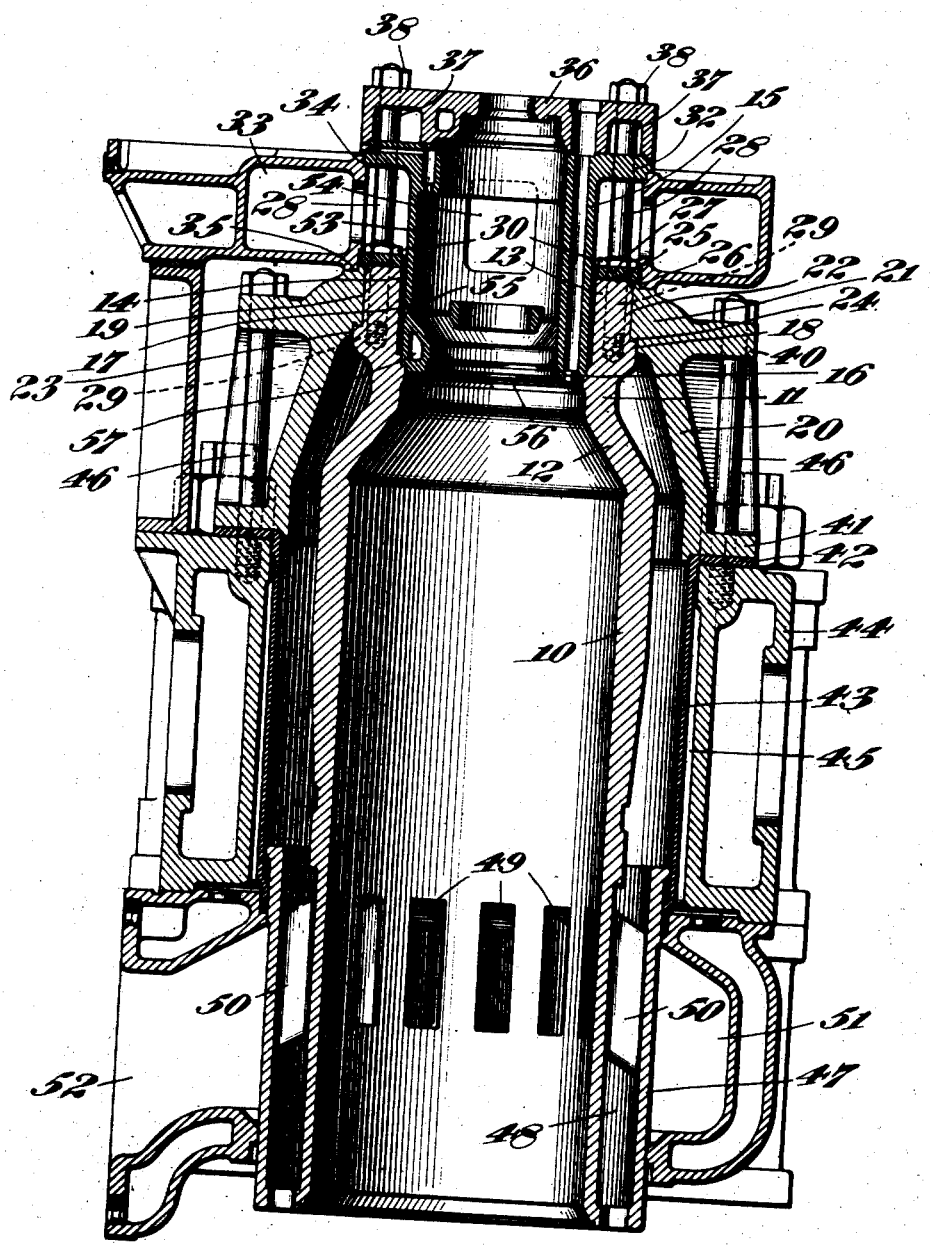

1,704,271

UNITED STATES PATENT OFFICE.

ARTHUR JACKSON WEST, OF BETHLEHEM, PENNSYLVANIA, ASSIGNOR TO BETHLEHEM STEEL COMPANY, OF BETHLEHEM, PENNSYLVANIA.

ENGINE-CYLINDER CONSTRUCTION.

Application filed September 25, 1925. Serial No. 58,646.

My invention relates to engines of the single acting type and it has for an object the provision of supporting means for the fluid admission end of a cylinder which shall be separate from but capable of rigid attachment to the cylinder, whereby the cylinder and the supporting means may be made of materials best suited to meet the peculiar needs or requirements of each.

More particularly, my invention relates to a cylinder construction for an internal combustion engine of the Diesel type employing a cylinder having a contracted neck portion and it has for an object to provide a supporting jacket member therefor which shall be separable from the outer end of the neck portion but held rigidly thereto in service, whereby the cylinder and the jacket member may be made of materials best suited to meet stresses encountered, whereby the cylinder may be machined and gauged to better advantage, and whereby either the cylinder or the supporting member, when injured, may be replaced without discarding the entire structure.

The present invention is a continuation in part of subject matter divided from my application, Serial No. 422,753, filed November 9, 1920, and since matured into Patent No. 1,602,089, Oct. 5, 1926, and reissued as Patent No. (Reissue) 16,909, March 20, 1928; and it possesses certain advantages over the structure disclosed and claimed in that application. It will be noted that, in the preferred form of my prior application, the supporting jacket member constitutes an integral part of the cylinder. In my present application, the supporting jacket member is made separate from the cylinder and connected thereto by a suitable joint. In this way, the cylinder may be made of a material best suited to meet service conditions, the best material for the cylinder or liner being cast iron, whereas the supporting member, which must withstand working forces of the engine, may be made of material better capable than cast iron for withstanding such forces. For example, the supporting member may be made of cast steel, which makes possible the use of a much lighter supporting member construction. Another advantage of the separate supporting member and cylinder constructions is that the cylinder may be machined and gauged to better advantage for the reason that these operations are not hindered by an overhanging jacket member. Furthermore, not only is casting a simpler proposition but also the effects of warping and deformation are not so serious for the reason that the cylinder and the supporting member may have the joint portions thereof machined so as to bring the cylinder into its correct position. An object of the present invention is, therefore, to provide a cylinder of the type referred to in my application aforesaid in which the supporting jacket member shall be made separate from the cylinder proper and secured thereto.

A further object of my invention is to provide an engine cylinder having a contracted neck portion at its explosion end provided with an interior seat for a valve cage and an external shoulder arranged beyond the seat together with a supporting jacket member which fits about the neck portion and contacts with the shoulder, thereby making possible the provision of a jacket space which extends about the cylinder and beyond the seat of the valve cage.

A further object of my present invention is to provide an engine cylinder for an internal combustion engine having a jacket member connected to one end thereof together with a recess which extends inwardly beyond the joint of the jacket member with respect to the cylinder and is provided at its inner end with a seat for a valve cage for the reception of a cage which is smaller than the recess so that the interior walls of the cage define with the recess an air space.

Apparatus made in accordance with my invention is illustrated in the accompanying drawings, forming a part of this application, in which:

The figure is a vertical sectional view of an engine cylinder incorporating my improvements.

Referring now to the drawing for a better understanding of my invention, in the figure, I show an engine cylinder 10 having a contracted portion, at 11, the contracted portion including an inner flaring portion 12 and an outer cylindrical neck portion 13. The neck portion is provided with a cylindrical recess 14 for a valve cage 15, the recess 14 being provided at its inner end with a countersunk seat 16 for the inner end of the cage structure. The cage 15 may, therefore, be made of slightly less diameter than the diameter of the recess 14 to provide an annular space 17 between the external surface of the cage 15 and the interior surface of the recess for the purpose to be described.

The neck portion 13 is provided externally with a rim or shoulder 18 which is arranged outwardly beyond the cage seat 16; and, beyond the shoulder 18, the neck portion is machined to provide a cylindrical joint surface 19.

The combined supporting and jacket member 20 is similar in design to the supporting and jacket member disclosed and claimed in my application aforesaid except that, in accordance with my present invention, it is made separate from the cylinder. To this end, I show the supporting and jacket member 20 provided with an inwardly extending portion 21 which is provided with a central cylindrical opening 22 which is machined to fit the cylindrical surface 19 of the neck portion accurately. Preferably the cylindrical opening 22 is countersunk, as indicated at 23, in order that packing 24 may be inserted to provide a fluid-tight joint. The inwardly extending portion 21 is of sufficient thickness so that the length of the cylindrical opening 22 may be made equal to the length of the cylindrical portion 19 of the neck so that the outer surfaces 25 and 26 of the neck and of the supporting member may be made flush in order that the clamping or holding ring 27 may bear effectively thereagainst to hold the cylinder and the supporting member 20 assembled.

The clamping ring 27 is held in position with respect to the neck portion 13 by screws 28 engaging tapped openings 29 in the neck portion which extend substantially parallel to the cylinder axis. The screws have heads 30 which engage the ring 27.

The cage 15 extends beyond the outer end of the neck portion and is provided with an outwardly-extending flange 32 which clamps an air chamber member 33 in position with respect to the supporting member, seats 34 and 35, respectively, being arranged between the chamber and the flange and between the chamber and the supporting member 20. Above the flange 32, I show a cap construction 36 for the cage. The screws 28 have shank portions 37 which extend through the flange 32 and through the cap 36 and have nuts 38 at the outer ends thereof which serve the purpose of holding the cap 36 in position and of clamping the cage 15 and the air chamber 33 in position between said cap and the supporting jacket member 20.

The cooling jacket construction for the cylinder 10, comprising as a part thereof the supporting jacket member 20, is similar to that disclosed in my application aforesaid. The supporting member 20 is provided with outwardly-extending flanges 40 and 41, the flange 41 being arranged at the lower end thereof and resting on an outwardly-extending flange 42 of a bridging jacket member 43, said outwardly-extending flange 42, in turn, resting upon the upper surface of the tabular support 44 for the cylinder, such tabular support being provided with a cylindrical opening 45 through which the cylinder and jacket construction extends downwardly. The supporting member 20 is held in position with respect to the tabular support 44 by bolts 46 which extend through the flanges 40 and 41 and, not only clamp the supporting member in position with respect to the tabular support 44, but serve to transmit working forces of the engine to the tabular support.

The lower end of the cylinder 10 is provided with an external, upwardly-extending jacket member 47 which is spaced from the wall of the cylinder to define a cooling space. The cylinder is provided with an annular series of exhaust outlets 49 which are provided by conduits 50, integral with the cylinder and with the jacket 47 and bridging the jacket space 48. The exhaust conduits 50 communicate with a suitable exhaust collection chamber 51 having an exhaust outlet 52. The bridging jacket member 43, which is fixedly secured in position with respect to the flange 41, has a telescopic fit at its lower end with respect to the adjacent end of the jacket member 47, whereby effects of differential expansion may be taken care of.

The region of the engine adjacent to the valves is the portion most highly heated and also the portion most difficult to cool. As already referred to, the joint between the supporting member and the outer end of the neck portion in my present construction is beyond the seat 16 for the cage 15, whereby the cooling jacket space defined by the supporting member 20 may extend well beyond the inner end of the cage in order that the neck portion in the vicinity of and about the cage seat may be adequately cooled. Cooling of the cage and neck construction is further provided by scavenge air received from the air chamber 33. To this end, the cage 15 is shown provided with a scavenge air chamber 53 which communicates by a lateral opening 54 with the interior of the air supply chamber 33, the chamber 33 surrounding the external surface of the cage 15 so that air may also be supplied to the space 17 already referred to. One or more ports 55 may extend through the wall of the cage in order that a circulation of air may take place in the space 19, air flowing thereinto from the chamber 33 and out from the latter through the ports 55 and to the interior of the cage. The lower end of the cage adjacent to the scavenge valve seat 56 is furthermore cooled by a water chamber 57 From this, it will be seen that, not only is the seat 56 for the scavenge valve adequately cooled, but also the seat for the cage is cooled through the cooperation of three media, first, heat is conducted through the wall of the neck portion to the cooling water of the main jacket, second, heat is conducted to air in the space 17, and, third, heat is conducted to the cooling space 57, thereby preventing the accumulation of heat at the joint between the cage and the cylinder and also providing for the possible conduction of heat from the seat 56 by the air of the space 17 and by the cooling water in the main jacket in addition to the cooling water in the space 57.

From the foregoing, it will be apparent that I have devised an engine cylinder which is supported at one end and which, in operation, is called upon to withstand only explosion or bursting pressures, working forces being transmitted to a separate supporting member connected thereto, such working forces being transmitted as compression stresses in the neck portion. These working forces are transmitted from the cylinder to the tabular support 44 by a supporting and jacket member 20, involving in such transmission a combination of shearing and tension stresses in the member 20 and tension stresses in the bolts 46. By having the supporting member 20 made as a separate part from the cylinder 10, the cylinder 10 may be accurately machined wherever necessary and properly gauged for the reason that every portion of its surface, particularly the surface thereof covered by the overhanging supporting jacket member, is accessible for machining and gauging. Also, the cylinder may be machined and gauged throughout to uniform circumferential thicknesses at every point along its axis, which is a matter of considerable importance due to the high temperatures encountered, particularly in the region of the flaring portion 12. Furthermore, the cylinder 10 may be made of material best capable of acting as a bearing and withstanding compression stresses, and cast iron best suits these needs. On the other hand, the supporting and jacket member 20 may be made of material, such as cast steel, which meets the peculiar conditions to which it is submitted better than cast iron. If, at any time, either the cylinder 10 or the supporting member 20 should have to be replaced, this may be done without discarding the entire cylinder and supporting member structure.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described my invention, what I claim as new and desire to secure by Letters Patent is:

1. In an engine, the combination with a supporting member having an opening therein, of a cylinder extending through said opening and spaced from the wall of the latter and having a piston bore and a contracted portion defining a combustion space, said cylinder being provided with a neck portion which extends beyond the combustion space and is provided with an exterior shoulder, a jacket member surrounding said contracted portion and supported on the first mentioned member and having a reduced bore portion receptive of said neck portion, and means including said shoulder for preventing axial movement between said cylinder and said jacket member.

2. In an engine, the combination with a cylinder having a piston bore and a contracted portion defining a combustion space and being provided with a neck portion which extends beyond the combustion space and is provided with an exterior shoulder, of a jacket member surrounding said contracted portions and having a reduced bore portion receptive of said neck portion, and means including said shoulder for preventing axial movement between said cylinder and said jacket member.

In testimony whereof I hereunto affix my signature this eighteenth day of September, 1925.

ARTHUR JACKSON WEST.